(12) United States Patent
Clor et al.

(10) Patent No.: US 8,282,150 B2
(45) Date of Patent: Oct. 9, 2012

(54) VEHICLE SEAT STOW RELEASE SYSTEM AND METHOD

(75) Inventors: Michael B. Clor, Commerce Township, MI (US); Dan Neaga, Canton, MI (US); Aleksandar Malusev, Northville, MI (US); M. Omer Dagcioglu, Llanwenog (GB)

(73) Assignee: Johnson Controls Technology Company, Holland, MI (US)

( * ) Notice: Subject to any disclaimer, the term of this patent is extended or adjusted under 35 U.S.C. 154(b) by 10 days.

(21) Appl. No.: 12/812,469

(22) PCT Filed: Mar. 3, 2009

(86) PCT No.: PCT/US2009/035842
§ 371 (c)(1),
(2), (4) Date: Oct. 26, 2010

(87) PCT Pub. No.: WO2009/111451
PCT Pub. Date: Sep. 11, 2009

(65) Prior Publication Data
US 2011/0031775 A1    Feb. 10, 2011

Related U.S. Application Data

(60) Provisional application No. 61/033,043, filed on Mar. 3, 2008.

(51) Int. Cl.
*B60N 2/02* (2006.01)

(52) U.S. Cl. .................................... 296/65.09; 297/335
(58) Field of Classification Search .............. 296/65.05, 296/65.08, 65.09, 65.12, 65.01; 297/335, 297/15, 378.12; 74/500.5
See application file for complete search history.

(56) References Cited

U.S. PATENT DOCUMENTS

| | | | |
|---|---|---|---|
| 3,410,515 A * | 11/1968 | Posh | 248/394 |
| 5,577,805 A * | 11/1996 | Glinter et al. | 297/378.12 |
| 6,158,800 A * | 12/2000 | Tsuge et al. | 296/65.09 |
| 6,644,730 B2 | 11/2003 | Sugiura et al. | |
| 7,029,063 B2 | 4/2006 | Holdampf | |
| 7,152,922 B2 * | 12/2006 | Garland | 297/362.11 |
| 7,201,425 B2 * | 4/2007 | Tsujibayashi et al. | 296/65.09 |
| 7,367,624 B2 * | 5/2008 | Garland | 297/362.11 |
| 7,500,707 B2 * | 3/2009 | Lutzka et al. | 296/65.03 |
| 2004/0084946 A1* | 5/2004 | Bonk | 297/378.14 |
| 2006/0066123 A1* | 3/2006 | Tsujibayashi et al. | 296/65.09 |
| 2007/0273172 A1 | 11/2007 | McLaughlin et al. | |
| 2008/0042472 A1 | 2/2008 | Holdampf et al. | |
| 2009/0218844 A1* | 9/2009 | Mitsuhashi | 296/66 |

\* cited by examiner

*Primary Examiner* — Glenn Dayoan
*Assistant Examiner* — Pinel Romain
(74) *Attorney, Agent, or Firm* — Dickinson Wright PLLC

(57) ABSTRACT

A fold flat seat and more specifically a cable control system for engaging and disengaging various actuators and latches to allow a vehicle seat to move between an upright position and various stowed or folded positions, as well as a method for stowing a vehicle seat with a single motion by the operator of the vehicle.

17 Claims, 7 Drawing Sheets

VEHICLE SEAT STOW RELEASE SYSTEM AND METHOD

CROSS REFERENCE TO RELATED APPLICATION

This is a U.S. National Stage patent application which claims the benefit of PCT International Application No. PCT/US2009/035842 filed on Mar. 3, 2009 which claims the benefit of U.S. Provisional Application Ser. No. 61/033,043 filed on Mar. 3, 2008, entitled "Stow Release System," the entire disclosures of these applications being considered part of the disclosure of this application and hereby incorporated by reference.

TECHNICAL FIELD

The present invention is directed to a fold flat seat and more specifically, to a cable control system for engaging and disengaging various actuators and latches to allow a vehicle seat to move between an upright position and various stowed or folded positions.

BACKGROUND

Manufacturers continually strive to create enhanced functionality in vehicles while at the same time minimizing system costs and weight. As part of system cost, manufacturers strive to reduce assembly time and cost as well as to reduce component cost, while improving the longevity of the components to minimize potential warranty costs. In particular, manufacturers strive to improve the functionality of rear seats capable of being stowed while reducing weight, assembly cost and component cost.

Stowable rear seats, in particular rear seats for SUV's, mini-vans, crossovers, and wagons have been the subject of much development recently for improved functionality. Specifically, manufacturers have strived to improve the ease with which the seats fold to various positions as well as the ability to fold flat to create a flat cargo area with the seats still in the vehicle. These stowable seats are typically mounted on pivoting brackets, and configured when being placed in the stowed position to fold the upper and lower seat halves together and then be rotated into a well or a depression formed in the vehicle floor.

In order to articulate or move the seat between various positions, a variety of latching systems must be manipulated or released. The seat is generally formed from a lower seat portion or cushion portion as well as a seat back or upper seat portion which are coupled together by a reclined mechanism which controls and maintains the selected relative angle between the seat back and the lower seat portion. To fold the seat from the upright seating position to a fully stowed position, the user would typically pull a handle to release the recline mechanism between the lower seat and upper seat. With the reclined mechanism released, the seat back is free to be tilted forward, flat against the lower seat half. The user would then release the handle and pull another latch system to release the front leg latches. With the front leg latches released, the user would tilt the seat backwards to a stowed position. In addition, the user may have to release an additional latch system to allow the seat to pivot rearward as well as release latches holding the legs in position to allow them to fold flat against the seat.

Manufacturers continually desire to simplify the number of steps required by the user to fold the seat flat as well as to return it to its upright seating position. In addition, manufacturers strive to reduce weight in the seat as well as component cost. Reduced seat weight improved fuel economy of the vehicle and makes the seat easier for a user to manipulate.

Therefore it would be desirable to have a single mechanism that folds the seat flat with a single interaction by the user. In contrast, as detailed above, the user is generally required to take multiple steps to release the recline mechanisms, leg latches as well as to fold the seat rearward and fold the leg flat into the seat.

SUMMARY OF THE INVENTION

The present invention is directed to a fold flat seat and more specifically, to a cable control system for engaging and disengaging various actuators and latches to allow a vehicle seat to move between an upright position and various stowed or folded positions, as well as a method for stowing a vehicle seat.

The seat generally includes an upper seat and a lower seat pivotably coupled together with a recline mechanism. The lower seat includes at least one leg and at least one latch mechanism. The lower seat is pivotably coupled to a vehicle with a pivot attachment.

The cable release system includes a first actuator or strap holder having a strap and a junction box having a lever arm pivotably coupled to the junction box. The lever arm includes a lateral extent and a pivot axis, wherein the pivot axis is offset from the center of the lateral extent. A first cable or strap cable extends between the junction box and the first actuator, and a second cable system extends between the junction box and the latch mechanism.

The method of folding the vehicle seat generally starts with the step of pulling a first actuator to release the latch mechanism. Then pulling the seat rearward about the pivot attachment with the first actuator. As the seat is pulled rearward, a recline release cable is automatically pulled by the seat's movement. The operator will continue pulling the seat rearward until the recline release cable disengages the recline release mechanism and the lower seat half and the upper seat half fold together. Also, as the seat is pulled rearward, a leg fold cable causes the legs to fold inward. The operator will then release the first actuator and drop the seat within a seat well on the vehicle. This all allows the operator to with a single motion pull the vehicle seat into a folded position and into the well of the vehicle.

To unstow the seat, the operator would lift the seat from the seat well and rotate the folded seat about the pivot attachment until the leg latches engage the leg anchors on the floor of the vehicle. The operator would then pull a second actuator to release the recline mechanism and pull the seat back to an upright position while pulling the second actuator. When the seat back is in the desired upright position, the operator would release the second actuator to lock the recline mechanism.

DETAILED DESCRIPTION

Figure 1:
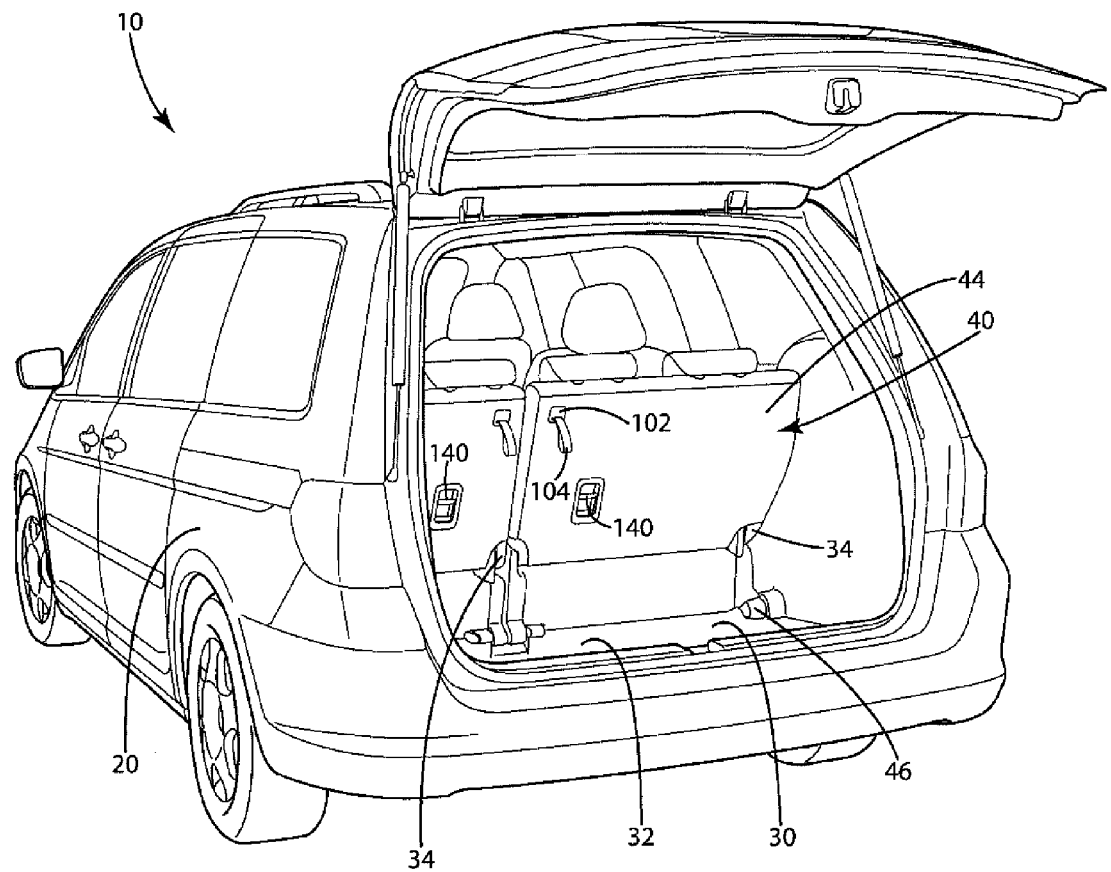
FIG. 1 is a rear perspective view of a vehicle including exemplary fold flat rear seats.
Figure 2:
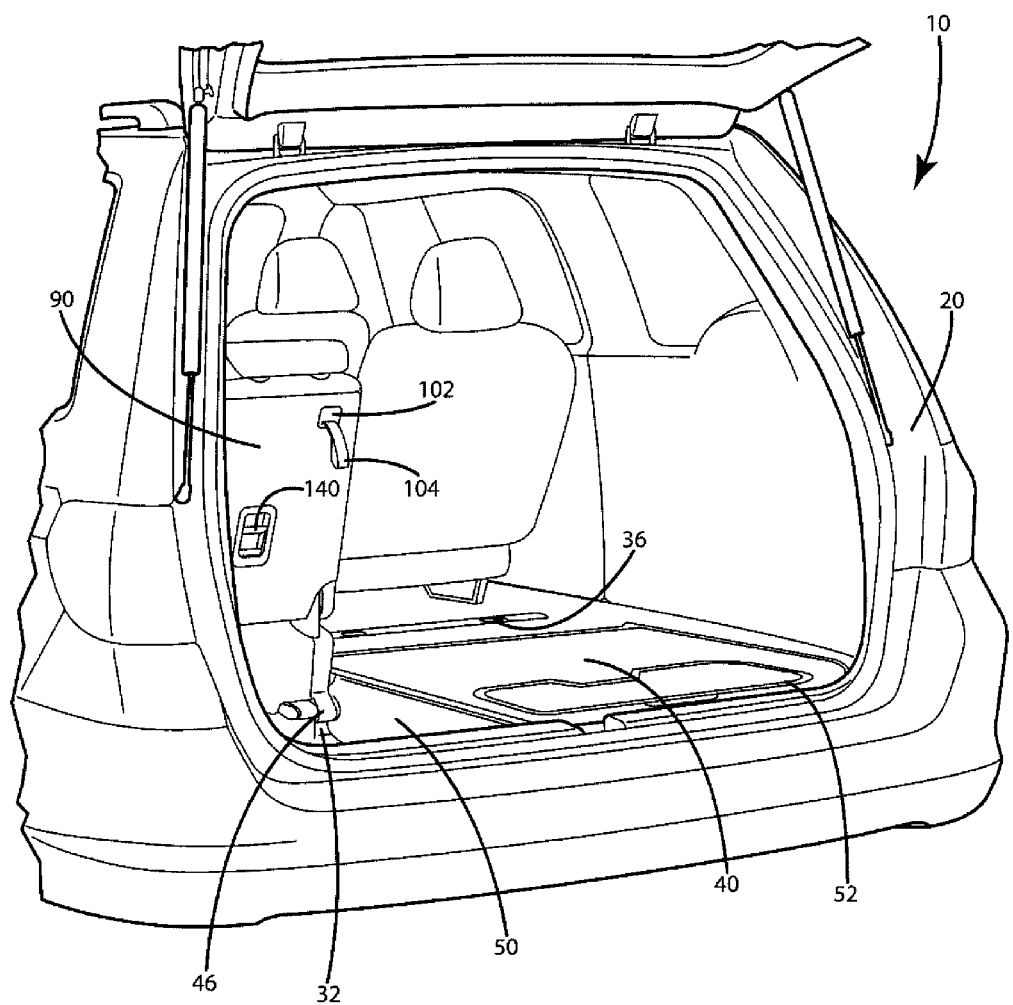
FIG. 2 is an enlarged rear perspective view of an exemplary vehicle having one of the exemplary fold flat seats folded flat and the other in an upright position.
Figure 3:
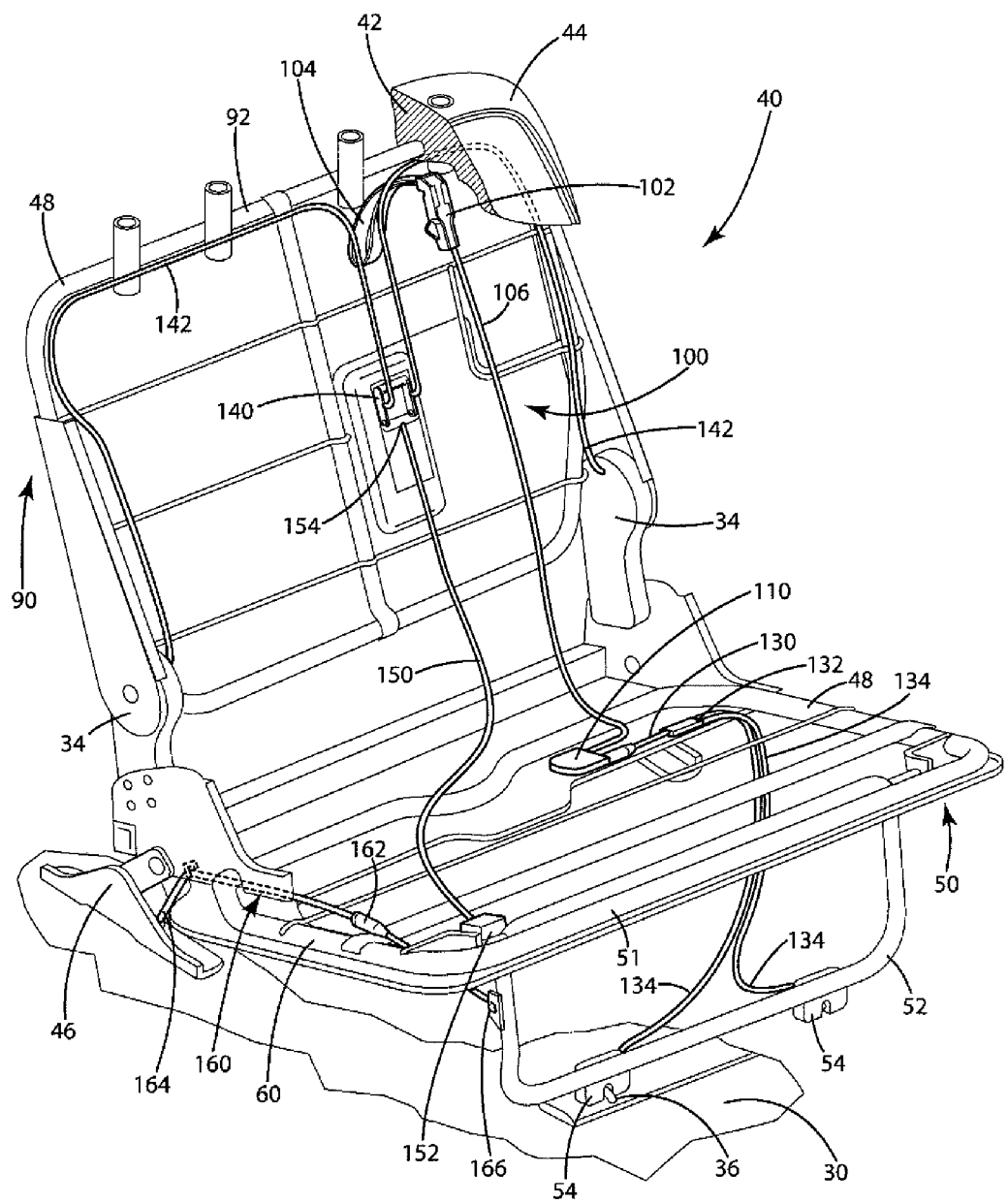
FIG. 3 is a front perspective view of a seat with a cushion and covering predominately removed to show the seat frame and cable control system.
Figure 4:
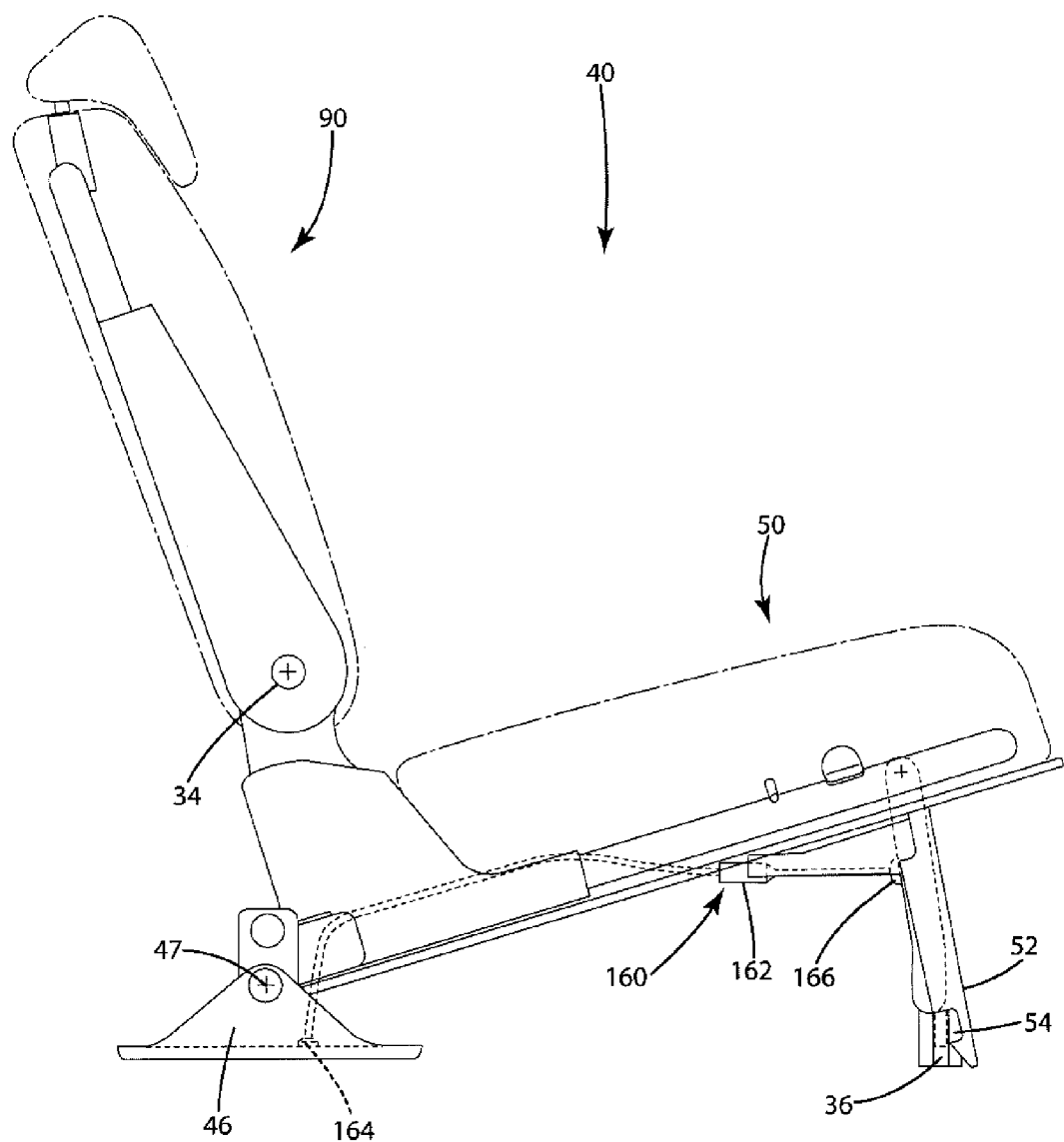
FIG. 4 is a side view of the exemplary seat detailing the cable system for folding the leg flat as the seat is moved to a fold flat position.

As illustrated in FIGS. 1 and 2, the present invention is generally directed to a seat 40 for a vehicle 10 and more specifically, as illustrated in FIGS. 3 and 4, to a cable release system 100 to easily allow a seat to be moved between the upright position in FIG. 1 and the stowed position in FIG. 2.

The vehicle 10 may be any vehicle in which it is desirable to have a folding rear seat 40. As illustrated in FIG. 1, with the seat 40 in an upright position, the vehicle 10 includes a vehicle body 20 that forms a structural support for the seat 40, specifically the vehicle floor 30, which also defines the seat well 32 into which the seat 40 fits into in the fold flat position. As further illustrated in FIG. 2, the 60% seat 40 is folded flat to fit within the seat well 32 while the 40% seat is still upright. While the seats 40 have been illustrated of having a 60, 40 percent configuration, any size or configuration including a single full row seat may be used with the present invention. The 60 and 40 percent seats are illustrated as a common exemplary seats in crossovers, mini-vans, and SUV's.

The seat 40 is illustrated in FIGS. 1-4 as being attached to the vehicle floor 30 by a pivot attachment 46. Of course, any other desired method of attachment to allow the seat to fold between the upright position and a fold flat position, that anchors the seat to the vehicle floor 30 may be used. As with most rear seats, the present invention is directed to a seat 40 that includes an upper seat or seat back 90 coupled to a lower seat or cushion seat 50. The upper seat 90 and lower seat 50 are generally coupled together with a recline or fold mechanism 34 which allows the upper seat 90 to tilt or fold flat in an articulate motion to the lower seat 50 as well as in some seats 40 allow the user to adjust the angle of recline of the upper seat 90. The seat 40 is illustrated in FIGS. 3 and 4 with the majority of the cushion 42 and surface material 44 removed to show the frame 48 of the seat. The frame 48 may be divided into a lower frame 60 and an upper frame 92. The frame 48 may have any desired shape or configuration to provide structural support to a user sitting within the seat as well as provide sufficient support for safety in the vehicle.

The seat 40 further includes leg(s) 52 and a recline pivot attachment 46 which anchors the seat 40 to the vehicle floor 30. The leg latches 54 on the leg 52 interlock with a leg anchor 36 on the vehicle floor 30. The pivot attachment 46, legs 52 and latches 54 may take on any desired size, shape or configuration so long as the seat is sufficiently anchored to the floor 30 and can pivot to a fold flat position in the cargo area.

The seat 40 includes a cable release system 100 which allows for improved ease of folding a rear seat 40 with fewer steps, reduced weight over existing seats and provides a lower system cost. The cable release system 100 allows the seat to be easily folded from an upright position as illustrated in FIG. 1 to a fold flat position as illustrated in FIG. 2. As illustrated in FIG. 3, the upper seat 90 includes a strap holder 102 attached thereto and a strap 104 extending therefrom. While the present invention illustrates a strap holder 102 with a strap 104 extending therefrom, other methods of pulling a cable such as a grab handle, lever or other device may be used and substituted for the strap 104. The strap and strap holder are lightweight and durable, while relatively low cost to produce and assemble.

The strap holder 102 and strap 104 are connected to a junction box 110 in the lower seat 50 via a strap cable 106. As illustrated in FIG. 3, the junction box 110 is connected to a leg release cable 130. In the illustrated embodiment in FIG. 3, the leg release cable 130 extends to a splitter 132 and splitter cables 134 extend from the splitter 132 down to the leg latches 54 on the leg 52. Of course, for a seat having only one leg latch 54, the splitter 132 and splitter cables 134 may be removed such that the leg release cable 130 can extend directly down to the single leg latch 54. Additional leg latches 54 may be added as desired and the splitter 132 may be instead, for example, split into three cables.

The cable release system 100 further includes a leg fold cable 160 which extends from an anchored end 164 through the lower seat 50 to the leg 52. The leg fold cable 160 ensures that as the seat is folded to the flat position, the leg 52 is folded flat against the lower portion of the lower seat 50. In the present invention, the leg fold cable 160 includes a first cable portion 161 which extends to a spring 162 from the anchored end 164. From the spring 162, a second cable portion 166 extends to the leg 52 and is anchored to the leg 52.

The cable release system 100 further includes a pair of recline cables 142 that extend from a handle 140 through the upper seat 90 to the recline mechanism 34. The recline mechanism 34 on some seats 40 may be located on only one side but in the illustrated embodiment is located on both sides of the seat 40. Therefore, the present invention is illustrated with a pair of recline cables 142 extending from the handle 140 to each of the recline mechanisms 34. Of course, in a seat 40 with only one recline mechanism, only one recline cable 142 would be needed. The recline mechanism 34 may be formed from any recline mechanism found on any seat, such as a gear in which a pin under spring pressure is pulled in and out of the tooth on the gear or a rack and pinion system. Of course, any other desired embodiment may be used as the recline mechanism. Coupled to the recline cables 142 may be an auto disengagement cable 150 which, as the seat is rotated to the fold position, automatically pulls on a fixed or movable point and in response applies a force to the recline cables that when the seat reaches a certain point in its rotation toward the fold flat position, the recline cables have been sufficiently pulled to release the recline mechanism and the seat under spring pressure within the recline mechanism folds into a clamshell position as illustrated in FIG. 7D. The act of folding is further illustrated in FIG. 7C. The auto recline disengagement cable 150 may extend to a variety of positions such as, for example, to the pivot attachment 46 whereas the seat is pivoted it pulls to an auto recline or to the leg 52 such as illustrated in FIG. 3 such that as the legs fold shut, the auto recline mechanism 150 pulls on the recline cables 142 to disengage the recline mechanism 34. Of course, any other attachment method for the auto recline disengagement cable 150 may be used.

Figure 5:
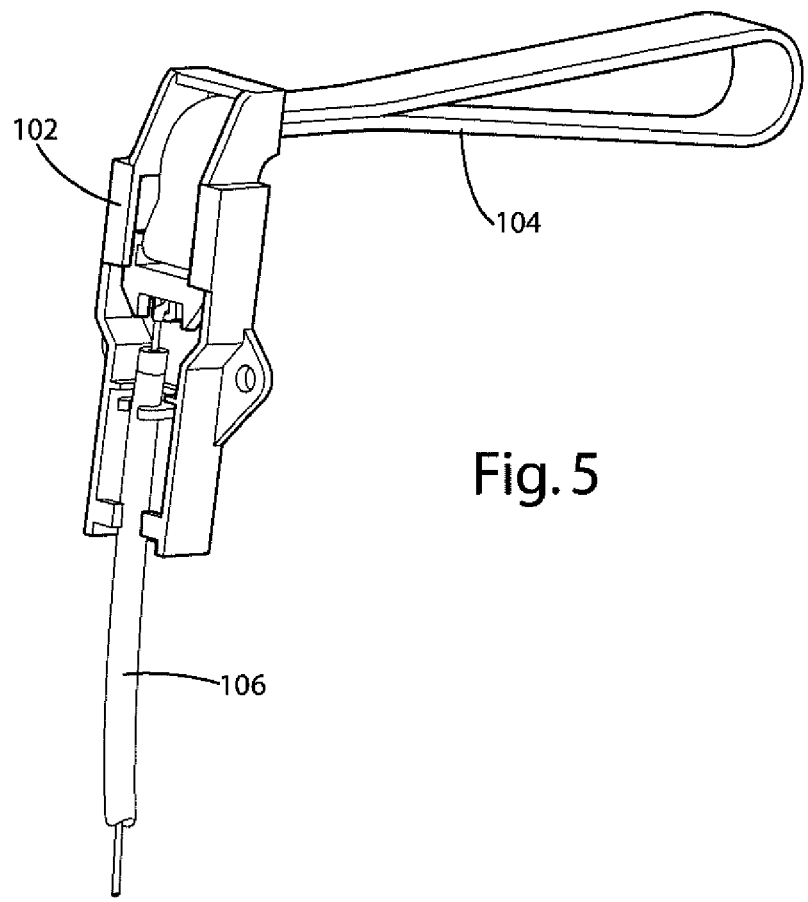
FIG. 5 is an enlarged perspective view of the strap and strap holder.

As further illustrated in FIG. 5, the strap attachment 102 is a simple lightweight attachment that attaches to the seat back or upper seat 90 and allows the user to pull a strap 104 which in turn pulls on the strap cable 106. Of course the strap holder 102 and strap 104 are only exemplary and other methods of pulling on the strap cable with ease of use may be used.

Figure 6:
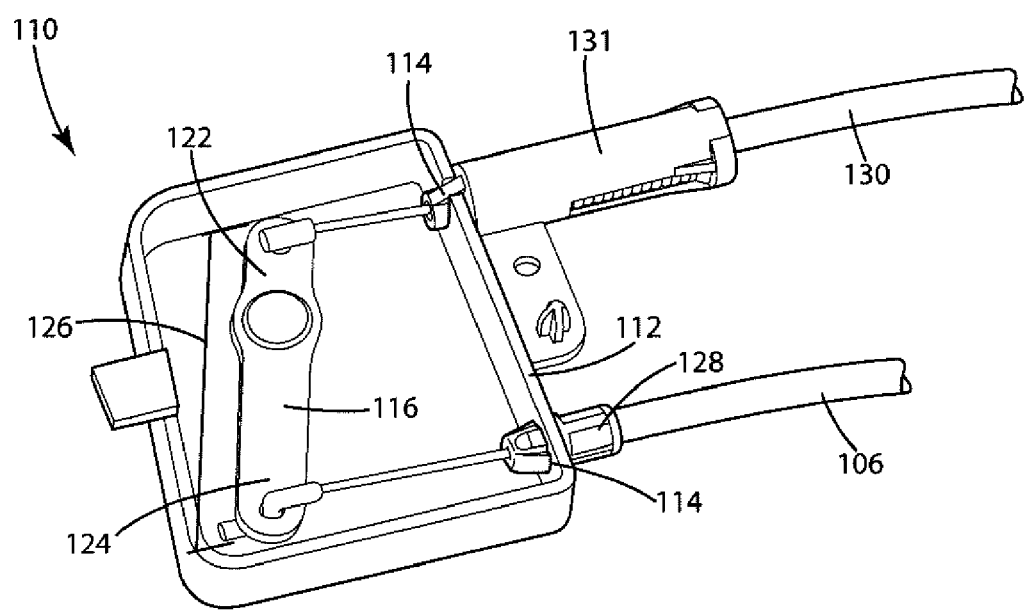
FIG. 6 is an enlarged perspective view of the junction box.

The junction box 110 is further illustrated in FIG. 6. The junction box 110 generally includes an outer structural shell 112 which has openings 114 which the strap cable 106 and leg release cable 130 are secured. As further illustrated in FIG. 6, the leg release cable 130 may include a spring assist 131 which may apply pressure to return the strap to its normal at rest position after the user releases the strap 104. Of course, the spring 131 may be configured to fit within the strap holder 102. In some embodiments, two springs, one at the junction box 110 and one at the strap holder 102 may be desirable. The strap cable 106 and leg release cable 130 are coupled to a lever arm 116 secured to the junction box with a pivot point hinge 118. The lever arm 116 generally has a lateral extension 126 and a center point 120. The lever arm 116 is configured such that the pivot point hinge 118 is to one side of the center 120 such that a first side of the pivot 122 is shorter than the second side of the pivot 124. This allows the user to have an easier release of the leg latches 54 by using the advantage of the lever arm 116 located in the junction box 110.

Figure 7A:
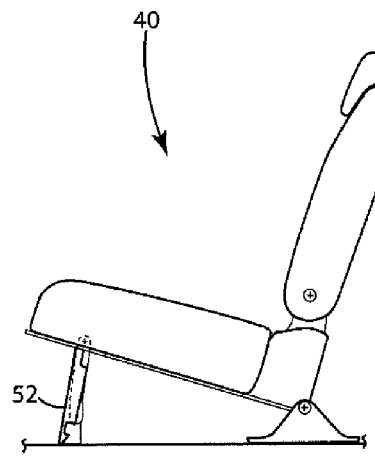
FIG. 7A is a side view of an exemplary seat in an upright seating position.

During operation, in vehicle seats 40 as shown in the upright position such as illustrated in FIGS. 1, 3 and 7A, is attached to the vehicle floor 30 through the use of leg anchors 36 coupled with leg latches 54 and a pivot attachment 46.

The operation of the seat 40 and in particular the cable release system 100 will be described in greater detail below especially with reference to the various seat positions shown in FIGS. 7A-7H. As illustrated in FIG. 7A and also in FIG. 4, a seat is illustrated in its upright seating ready position, and coupled securely to the floor. In this position, the seat generally has legs 52 which are anchored through leg latches 54 to leg anchors 36 on the vehicle floor 30. While this position is illustrated in FIG. 7A, the seat 40 through the handle 140 and recline cables 142 may recline or tilt forward such that the upper seat 90 articulates relative to the lower seat 50.

Figure 7B:
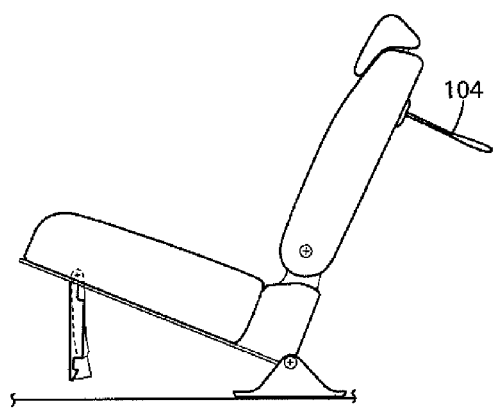
FIG. 7B is a side view of an exemplary seat in a first position after the leg latch has been released and being moved towards the fold flat position.
Figure 7C:
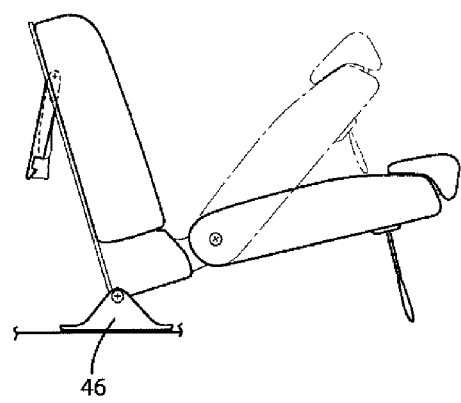
FIG. 7C is a side view of an exemplary seat in a second position showing the release of the recline mechanism and the seat back in phantom illustrating the lower seat and upper seat folding to a flat clamshell position after release of the recline mechanism.
Figure 7D:
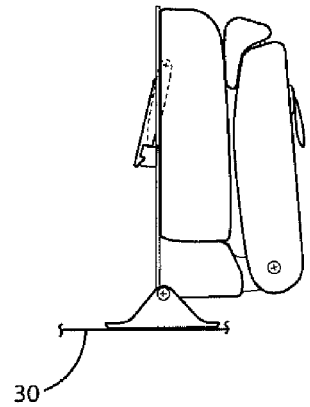
FIG. 7D is a side view of an exemplary seat in a third position illustrating the clamshell position with the leg substantially stowed.

If the operator of the vehicle desires to fold the seat 40 flat such as the seat illustrated in FIG. 1 to a position as illustrated in FIG. 2, the operator would pull on the strap 104. By pulling on the strap 104, the strap holder 102 transfers the movement to a coupled strap cable 106. The strap cable 106 extends to the junction box 110 as illustrated in FIG. 6. The pulling of the strap cable 106 causes the second side 124 of the lever arm 116 to be pivoted toward the opening 114 securing the strap cable 106. This movement causes the lever arm 116 to pull on the leg release cable 130. If there is only one leg latch 54 on the seat 40, the leg release cable 130 will extend directly to the leg latches 54. If two leg latches 54 or more exist, the leg latch release cable 130 extends to a splitter 132 which splits the cable as is well known in the art to extend with the splitter cables 134 to the leg latches 54. Therefore, as illustrated in FIG. 7B, by pulling on the strap the user has released the leg latches 54 from being engaged against the leg anchor 36 such that the forward portion 51 of the lower seat starts to rotate or pivot upwardly about the pivot axis 47 of the pivot attachment 46. More specifically, by a single motion, the user releases the leg latches and pivots the seat rearward to a fold flat position. As the user continues to pull the strap 104 backward further pivoting the seat 40 such that the seat 40 and in particular the seat back 90 is nearing a horizontal position, the recline mechanism is released pivoting the upper seat back up toward a clamshell position as illustrated in FIG. 7D, all as part of the single motion.

Figure 7E:
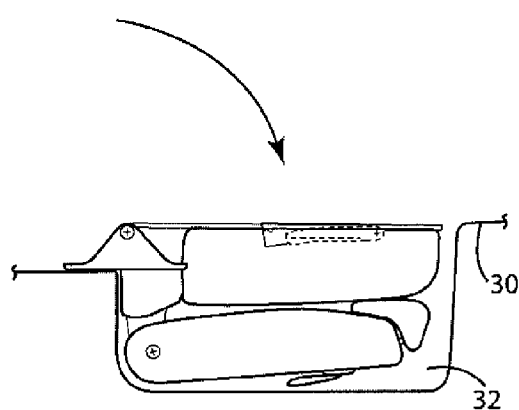
FIG. 7E is a side view of an exemplary seat in a stowed position.
Figure 7F:
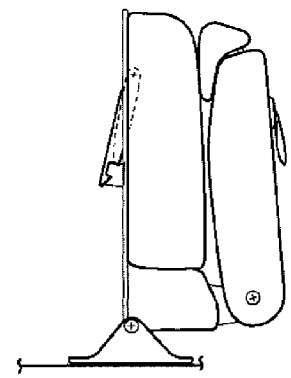
FIG. 7F is a side view of an exemplary seat being removed from the stowed position.

More particularly, as the seat is pivoted back in FIG. 7B, the auto recline disengagement cable 150 is pulled which in turn pulls on the recline cables 142 coupled to the recline mechanisms 34. This disengages the recline lock such that the seat 40 folds flat to the clamshell position in FIG. 7D automatically as the user is pulling the strap backwards. The spring tension in the recline mechanism is expected to force the seat forward to a clamshell position as illustrated in FIG. 7D. However, although the seat 40 is illustrated in clamshell position as being perfectly vertical, it is relatively possible that the seat may be at any position along its path toward the fold flat position illustrated in FIG. 2 such that the seat 40 may be pivoted further to the cargo area than is illustrated in FIG. 7D when the recline mechanism puts it into a clamshell position. More specifically, the user, while holding the strap, when the recline mechanism disengages may cause the lower seat 50 to actually pivot toward the upper seat back 90 to an almost fold flat position such as the user upon releasing the strap 104 would have the seat enter the seat well 32 with minimal movement. The seat 40 entering the seat well 32 is illustrated in FIG. 7E. Upon releasing the strap 104, the spring assist 131 attached to the junction box 110 pulls the strap cable back in and resets the leg latches which also may include springs to further assist in the reset, such that the legs when the seat is unfolded, and in particular the leg latches will be ready to engage in a latch position to the leg anchors 36.

As the seat is also moving along the positions illustrated in FIGS. 7A through 7E, the leg fold cable 160 illustrated in greater detail in FIGS. 3 and 4, is also acting upon the leg 52 to fold the leg 52 inward. More specifically, as illustrated between FIGS. 7A and 7B as the seat 40 and in particular, the lower seat 50 is pivoted upward, the leg fold cable 160 pulls the leg 52 inward to fold against the bottom of the lower seat 50. The further this pivoting movement continues, the more the leg 52 is pulled into the seat to crate a flat surface. As illustrated in FIGS. 3 and 4, the leg fold cable 160 includes a spring 162 disposed between two independent cables. This spring is such that when the seat is in positions between that illustrated in FIGS. 7D and 7E before reaching FIG. 7E, the leg 52 will already be folded flat and the additional movement to FIG. 7E pulls on the spring 162 as the leg 52 is already completed folded. The spring allows for manufacturing tolerances as well as to eliminate the potential of broken cables if the leg jams or is obstructed from folding flat, as well as ensures the leg 52 remains folded flat in the fold flat position.

Figure 7G:
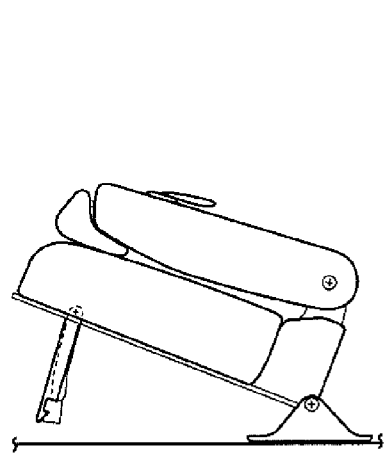
FIG. 7G is a side view of an exemplary seat in position to latch to the floor.
Figure 7H:
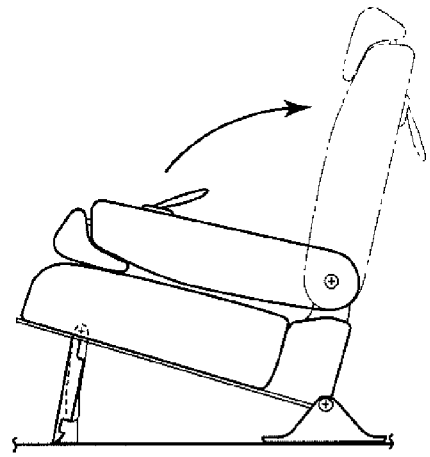
FIG. 7H is a side view of a seat being latched to the floor and the upper seat back in phantom being moved from the lower position to the upright seating position.

As illustrated in FIGS. 7E through 7H, the seat 40 is returned from the fold flat position illustrated in FIG. 2 to the upright position illustrated in FIGS. 1 and 4. The user picks up the seat out of the seat well 32 and rotates it forward with the springs in the legs forcing the leg outward into a latch ready position, as illustrated in FIG. 7G. The seat is folded down then with the seat still in a clamshell position with the leg latches 54 latching to the leg anchors 36. The user then pulls the handle 140, illustrated in FIG. 3, attached to the recline cables to release the recline mechanism 34 and pulls the seat back 90 upright into a seating ready position, shown in phantom lines in FIG. 7H. Once the seat is in the seat back position 90 in the desired position, the user releases the handle 140 and the recline mechanisms engage and lock the seat back relative to the seat bottom.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A cable release system for a vehicle seat having an upper seat and a lower seat pivotably coupled together with a recline mechanism and wherein said lower seat includes at least one leg and at least one latch mechanism and wherein said lower seat is pivotably coupled to a vehicle with a pivot attachment, said cable release system comprising:
   a first actuator; and
   a junction box having single a lever arm coupled to a first cable and a second cable and wherein said lever arm is pivotably coupled to said junction box, said lever arm having a lateral extent with a first end and a second end and a pivot axis wherein said pivot axis is offset from the center of the lateral extent and wherein said
   first cable extends between said junction box and said first actuator and wherein said first cable is coupled to said lever arm proximate to said first end and wherein said
   second cable extends between said junction box and the latch mechanism and wherein said second cable is coupled to said lever proximate to said second end, and wherein said junction box includes a spring coupled to said second cable.

2. A cable release system for a vehicle seat having an upper seat and a lower seat pivotably coupled together with a recline mechanism and wherein said lower seat includes at least one leg and at least one latch mechanism and wherein said lower seat is pivotably coupled to a vehicle with a pivot attachment, said cable release system comprising:
   a first actuator;
   a junction box having a lever arm pivotably coupled to said junction box, said lever arm having a lateral extent with a first end and a second end and a pivot axis wherein said pivot axis is offset from the center of the lateral extent;
   a first cable extending between said junction box and said actuator and wherein said first cable is coupled to said lever arm proximate to said first end;
   second cable extending between said junction box and the latch mechanism and wherein said second cable is coupled to said lever proximate to said second end; and
   wherein said junction box includes a spring coupled to said second cable.

3. The cable release system of claim 2 wherein said spring applies a biasing force to said lever arm.

4. The cable release system of claim 3 wherein said junction box includes an outer shell having a first cable entrance for said first cable and a second cable entrance for said second cable and wherein said biasing force at rest disposes said lever arm closer to second cable entrance than said first cable entrance.

5. The cable release system of claim 1 wherein said first actuator includes a strap coupled to said first cable.

6. A cable release system for a vehicle seat having an upper seat and a lower seat pivotably coupled together with a recline mechanism and wherein said lower seat includes at least one leg and at least one latch mechanism and wherein said lower seat is pivotably coupled to a vehicle with a pivot attachment, said cable release system comprising:
   a first actuator;
   a junction box having a lever arm pivotably coupled to said junction box, said lever arm having a lateral extent with a first end and a second end and a pivot axis wherein said pivot axis is offset from the center of the lateral extent;
   a first cable extending between said junction box and said actuator and wherein said first cable is coupled to said lever arm proximate to said first end;
   second cable extending between said junction box and the latch mechanism and wherein said second cable is coupled to said lever proximate to said second end; and
   a leg fold cable system extending directly between the at least one leg and the pivot attachment.

7. A cable release system for a vehicle seat having an upper seat and a lower seat pivotably coupled together with a recline mechanism and wherein said lower seat includes at least one leg and at least one latch mechanism and wherein said lower seat is pivotably coupled to a vehicle with a pivot attachment, said cable release system comprising:
   a first actuator;
   a junction box having a lever arm pivotably coupled to said junction box, said lever arm have a lateral extent and a pivot axis wherein said pivot axis is offset from the center of the lateral extent;
   a leg fold cable system extending between the at least one leg and the pivot attachment;
   a first cable extending between said junction box and said actuator; and
   a second cable extending between said junction box and the latch mechanism and wherein said leg fold cable includes a spring disposed between a first cable and a second cable and wherein said first cable is coupled to said at least one leg and the second cable is coupled to the at least one pivot attachment.

8. The cable release system of claim 7 wherein said leg fold cable is configured to apply a force to the at least one leg in the direction of folding the leg against the lower seat as the lower seat is pivoted in a first direction about the pivot attachment.

9. The cable release system of claim 8 wherein said leg fold cable is configured to have a length that after a specified angle of rotation in said first direction, the force from said rotation causing said spring to extend.

10. The cable release system of claim 1 further including an auto recline release cable extending from the recline mechanism.

11. The cable release system of claim 10 wherein said auto recline release cable includes a handle disposed between said recline mechanism and a terminal end.

12. A cable release system for a vehicle seat having an upper seat and a lower seat pivotably coupled together with a recline mechanism and wherein said lower seat includes at least one leg and at least one latch mechanism and wherein said lower seat is pivotably coupled to a vehicle with a pivot attachment, said cable release system comprising:
   a first actuator;
   a junction box having a lever arm pivotably coupled to said junction box, said lever arm have an integral lateral extent and a pivot axis wherein said pivot axis is offset from the center of the lateral extent;
   a first cable extending between said junction box and said actuator and coupled to said lever arm within said integral lateral extent;
   a second cable extending between said junction box and the latch mechanism and coupled to said lever arm within said integral extent; and
   an auto recline release cable extending from the recline mechanism, said auto recline release cable including a handle disposed between said recline mechanism and a terminal end and wherein said auto recline release cable includes a terminal cable extending between said terminal end and said handle, and a recline cable extending between said handle and the recline mechanism.

13. A method of folding a vehicle seat having an upper seat and a lower seat pivotably coupled together with a recline mechanism and wherein said lower seat includes at least one leg and at least one latch mechanism and wherein said lower seat is pivotably coupled to a vehicle with a pivot attachment, said method comprising:
- pulling a first actuator to release the latch mechanism;
- pulling the seat rearward about the pivot attachment with said first actuator and wherein as said seat is pulled rearward, a recline release cable is automatically pulled by the seat's movement;
- continue pulling said seat rearward until said recline release cable disengages the recline release mechanism and the lower seat half and the upper seat half fold together and wherein as said seat is pulled rearward, a leg fold cable having a pivot end coupled to said pivot attachment and a leg end coupled to said legs stays stationary at said pivot end while said leg end extends in an arcuate motion about said pivot attachment and causes said legs to fold inward; and
- release said first actuator and placing said seat within a seat well on the vehicle.

14. The method of claim 13 further including the steps of:
- lifting the seat from the seat well;
- rotating the folded seat about the pivot attachment;
- engaging the leg latches;
- pulling a second actuator to release the recline mechanism;
- pulling the seat back to an upright position while pulling the second actuator; and
- releasing the second actuator to lock the recline mechanism.

15. A method of folding a vehicle seat into a seat well on a vehicle with a single motion, said vehicle seat having an upper seat and a lower seat pivotably coupled together with a recline mechanism and wherein said lower seat includes at least one leg and at least one latch mechanism in a latched position with the seat is in an upright position and wherein said lower seat is pivotably coupled to a vehicle with a pivot attachment, said method comprising:
- by a single action, pulling a first actuator in a direction away from the rear of the upper seat, causing the latch mechanism to release and allowing the seat to pivot rearward about the pivot attachment and wherein as the seat pivots about the pivot attachment, a recline release cable is automatically pulled by the seat's movement and disengages the recline release mechanism causing the lower seat half and the upper seat half fold together into a clamshell position and wherein as the seat is pulled rearward, a leg fold cable extending between said pivot attachment and said legs automatically causes said legs to fold inward; and
- upon releasing the first actuator, the seat is configured to fit within a seat well on the vehicle.

16. The method of claim 15 wherein upon releasing the first actuator, the seat automatically falls into the seat well and into a fold flat position.

17. A cable release system for a vehicle seat having an upper seat and a lower seat pivotably coupled together with a recline mechanism and wherein said lower seat includes at least one leg and at least one latch mechanism and wherein said lower seat is pivotably coupled to a vehicle with a pivot attachment, said cable release system comprising:
- a first actuator;
- a junction box having a unitary lever arm pivotably coupled to said junction box;
- a first cable coupled to said lever arm extending between said lever arm and said actuator; and
- a second cable coupled to said lever arm and extending between said lever arm and the latch mechanism, and wherein said lever arm includes a lateral extent between said first and second coupled cables and wherein said pivot axis is offset from the center of said lateral extent.

* * * * *